United States Patent [19]

Mankey

[11] Patent Number: 5,205,452
[45] Date of Patent: Apr. 27, 1993

[54] PORTABLE CAR CONSOLE

[75] Inventor: Neal N. Mankey, Charlotte, N.C.

[73] Assignee: Allied Plastics, Inc., Gastonia, N.C.

[21] Appl. No.: 777,076

[22] Filed: Oct. 16, 1991

[51] Int. Cl.⁵ .................................... B60R 7/00
[52] U.S. Cl. .................................. 224/275; 296/37.15
[58] Field of Search ................ 224/273, 275, 277;
108/25, 44; 211/73, 126; 312/235.8; 297/194;
D12/155; D3/40, 35; 248/188.2; 296/37.1,
37.5, 37.8, 37.15

[56] References Cited

U.S. PATENT DOCUMENTS

| | | | |
|---|---|---|---|
| D. 237,166 | 10/1975 | Jensen | D12/155 |
| D. 238,160 | 12/1975 | Rogers | D12/155 |
| D. 267,444 | 1/1983 | Ruxton | D3/40 |
| D. 271,634 | 12/1983 | Rockwell | D3/40 |
| D. 304,263 | 10/1989 | Mull | D3/40 |
| 2,524,909 | 10/1950 | Hines | 224/275 X |
| 2,670,260 | 2/1954 | Watt | 297/194 |
| 3,244,125 | 4/1966 | Mackey | 108/25 |
| 3,304,143 | 2/1967 | Connell | 312/235.8 X |
| 3,326,446 | 6/1967 | Goings | 312/235.8 X |
| 3,338,629 | 8/1967 | Drees | 312/235.8 X |
| 3,379,316 | 4/1968 | Harrell | 211/73 |
| 3,873,010 | 3/1975 | Patterson | 224/275 |
| 3,893,569 | 7/1975 | Hoch | 211/74 |
| 3,939,986 | 2/1976 | Pierro | 211/74 |
| 4,146,159 | 3/1979 | Hemmen | 224/275 |
| 4,577,788 | 3/1986 | Richardson | 224/273 |
| 4,619,386 | 10/1986 | Richardson | 224/277 |
| 4,796,791 | 1/1989 | Goss et al. | 224/275 |
| 4,832,241 | 5/1989 | Radcliffe | 324/275 |
| 4,928,865 | 5/1990 | Lorence et al. | 224/275 |
| 4,949,890 | 8/1990 | Schultz | 224/275 |
| 5,096,152 | 3/1992 | Christiansen et al. | 224/275 X |

FOREIGN PATENT DOCUMENTS

| | | | |
|---|---|---|---|
| 2124189 | 2/1984 | United Kingdom | 224/275 |
| 2223466 | 4/1990 | United Kingdom | 224/275 |

Primary Examiner—Henry J. Recla
Assistant Examiner—Glen T. Barrett
Attorney, Agent, or Firm—Bell, Seltzer, Park & Gibson

[57] ABSTRACT

The disclosed invention relates to a car console having an adjustable foot so that the console can be placed and leveled on different kinds of car seats despite their different slopes and shapes. The support leg can be placed in various positions along the length of the bottom of the console to raise or lower the height of the rear of the console. Further, the support leg can be removed altogether if the console is placed on a flat or substantially flat surface.

12 Claims, 2 Drawing Sheets

PORTABLE CAR CONSOLE

FIELD OF THE INVENTION

This invention relates generally to a car console, and specifically relates to an adjustable console that can be placed and levelled on all kinds of car seats despite their different slopes and shapes.

BACKGROUND

Although numerous consoles and food trays have been designed to be mounted in cars on dashboards, floors and seats, many of these prior consoles have limited applications and versatility to be adapted for use on vehicle seats having different slopes and shapes. Generally, trays or drink holders have support configurations adaptable to arbitrary slopes—typically a flat surface or a surface having a predetermined slope. Presently, however, car seats and surfaces in the numerous models of automobiles available have many different shapes, slopes and sizes. Although prior devices may be suitable for one, or even a limited number of car surface shapes, for instance, the hump or transmission cover on a car floor, they are ill equipped for a wide range of car seat shapes and slopes. Because a common purpose of a car console is to provide a level surface to support drinks or other items, prior devices are not useful except on the specific seats or surfaces having specific slopes and shapes for which they were designed. Uneven surfaces cannot be a suitable platform for cups of coffee or other drinks, because they allow spillage from the cup or may even allow a cup to turn over completely.

For the reasons noted above, many prior devices are not conveniently portable for use in different vehicles or surroundings. This means a consumer must have different consoles to use in different cars having different interior designs. Further, many prior consoles require some attachment to a car seat, for instance, anchoring by the seat belt. These restrictions further limit the versatility and adaptability of use of prior consoles in multiple surroundings.

OBJECT AND SUMMARY OF THE INVENTION

The object of the present invention is to overcome the previously discussed shortcomings by providing an adaptable console with a level top surface for use on different car seats that have different slopes and shapes.

The present invention meets these objectives by providing a console that is adaptable to car seats having different slopes and shapes. The invention includes a support leg that can be placed in various positions along the length of the bottom of the console to raise or lower the height of the rear of the console. Regardless of the slope of the seat, therefore, the support leg of the console can be moved to level the top surface of the console and allow it to properly serve its purpose of providing a level, horizontal platform. Further, the support leg can be removed completely if the console is placed on a flat or substantially flat surface.

The present invention is versatile in its portability. The console can be simply picked up and moved to another car seat and adjusted to provide a level platform in different surroundings. The console also preferably includes rubberized or other nonskid material adhered to its bottom side. This minimizes the console slipping laterally or forward and back as the car is driven.

Other objects and advantages of the invention will become apparent upon reading the following detailed description and appended claims, and upon reference to the accompanying drawings, in which:

DESCRIPTION OF THE PREFERRED EMBODIMENT

Figure 1:
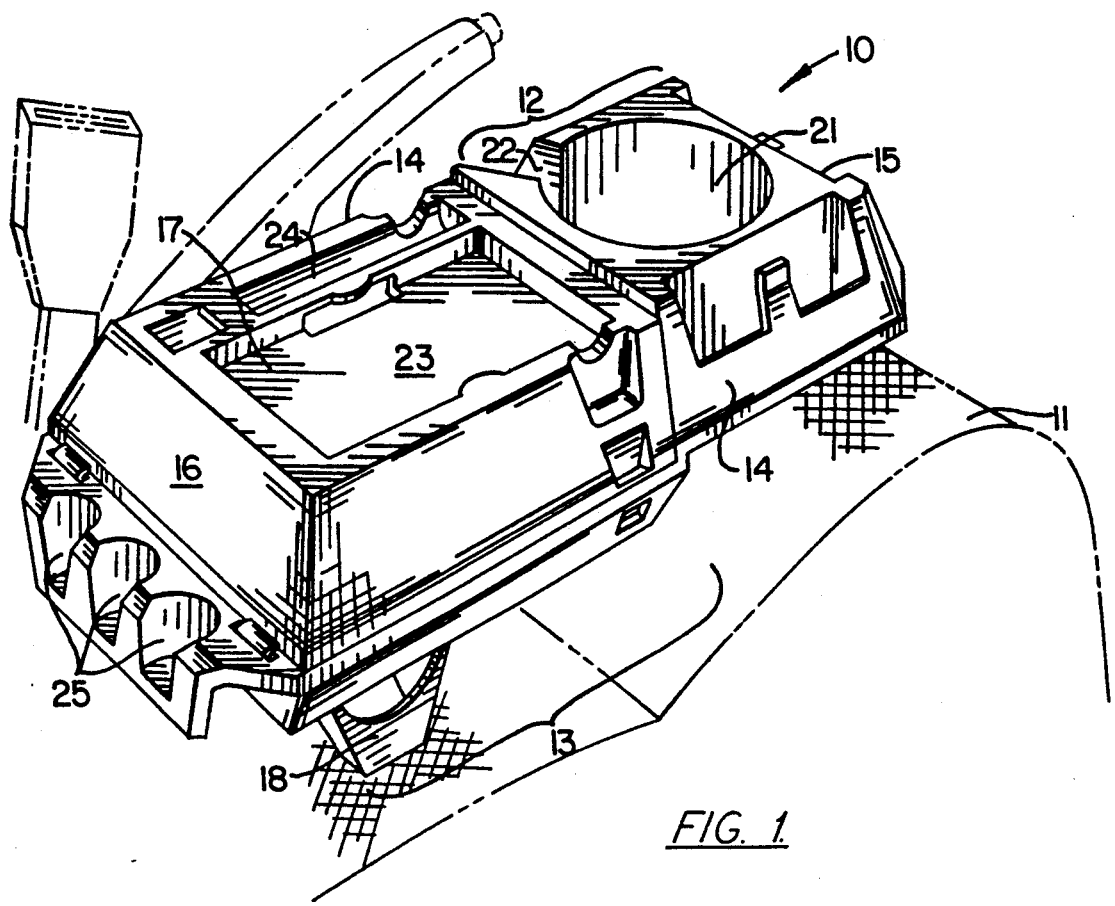
FIG. 1 is a perspective view of the car console as viewed from above and to the side and rear of the console, and illustrating the environment of a car seat.

Turning first to FIG. 1, the console 10 embodying the present invention is shown resting on a sloping car seat 11. The illustrated embodiment has a body having a generally box-like shape and includes a front portion 12 and a rear portion 13. It is understood that the console may assume other shapes that may make it more aesthetically pleasing to a consumer or that may be adapted to hold specific items that would require a different general configuration. It is preferred that the console can be made of plastic material formed by injection molding or other commercially known methods. A plastic material is not affected by moisture and is generally lightweight. Nevertheless, cardboard or other materials may be used to form all or a part of the console.

The console 10 is defined by side walls 14, a front end wall 15 and rear end wall 16. Also seen in FIG. 1 is the top side 17. The bottom side of the car console is resting on the car seat. The bottom side 18 is more clearly illustrated in FIG. 3. Also illustrated in the Figures is a supporting member 18 or support leg protruding from the bottom of the console and that supports the rear portion of the console.

Figure 2:
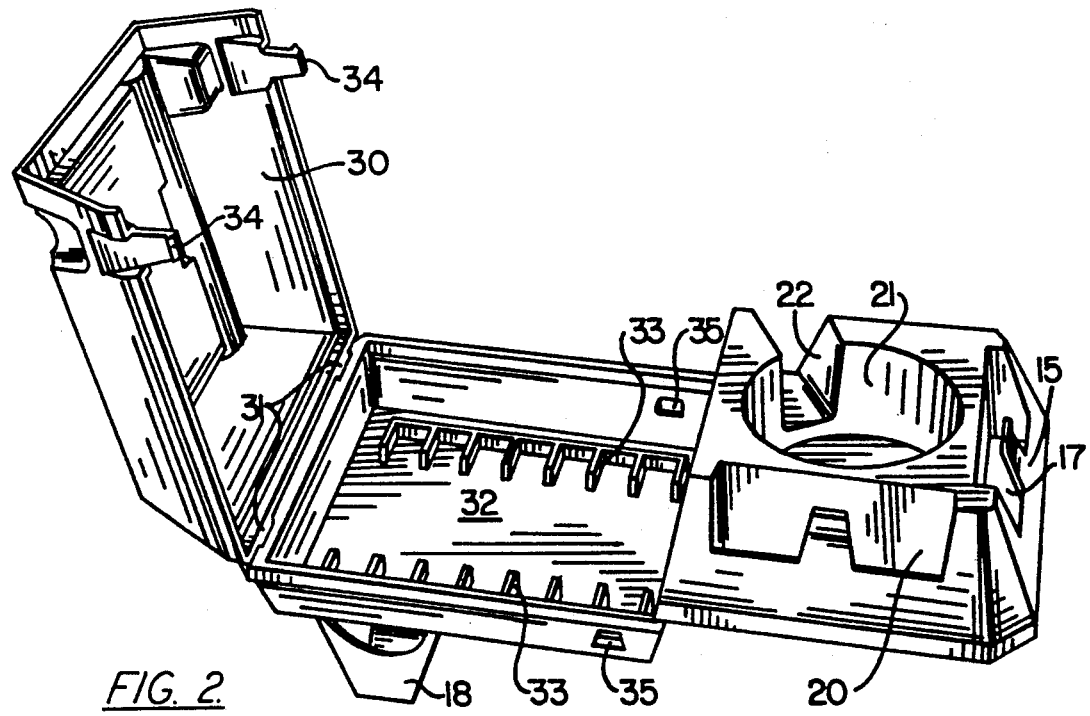
FIG. 2 is a perspective view of the car console as seen from above and to the side and front and illustrated in its opened position.

Referring to FIG. 2, the front end wall 15 defines a compartment 19 that is adapted to receive notes, receipts or other items that may be placed there by a person in the car. A similar compartment 20 is illustrated in FIG. 2 and is shown on the side wall 14 of the front portion 12 of the console. Like the compartment 19 on the front end wall, the compartment 20 is adapted for receiving notes, receipts or other items that may be placed there by the driver or a passenger in the car. Other compartments or useful configurations may be designed into the console at various locations.

Referring again to FIGS. 1 and 2, the top wall 17 of the front portion of the console defines a beverage holder 21. Further, there is a notch 22 that is adapted to receive the handle of a coffee cup or other cup to be placed in the beverage holder 21. Again, other types of beverage holders or useful compartments may be designed into and defined by the top of the front portion of the console.

The top of the rear portion of the console defines a notepad holder 23 that is adapted to hold sheets of paper for notes or other uses. Also on the top of the rear portion of the console is a groove 24 for holding a pen or pencil or other writing utensil. While the illustrated embodiment is preferred, the console may include a beverage holder in the rear portion and a note pad holder in the front portion. Numerous variations are possible and envisioned by the disclosed invention.

Figure 3:
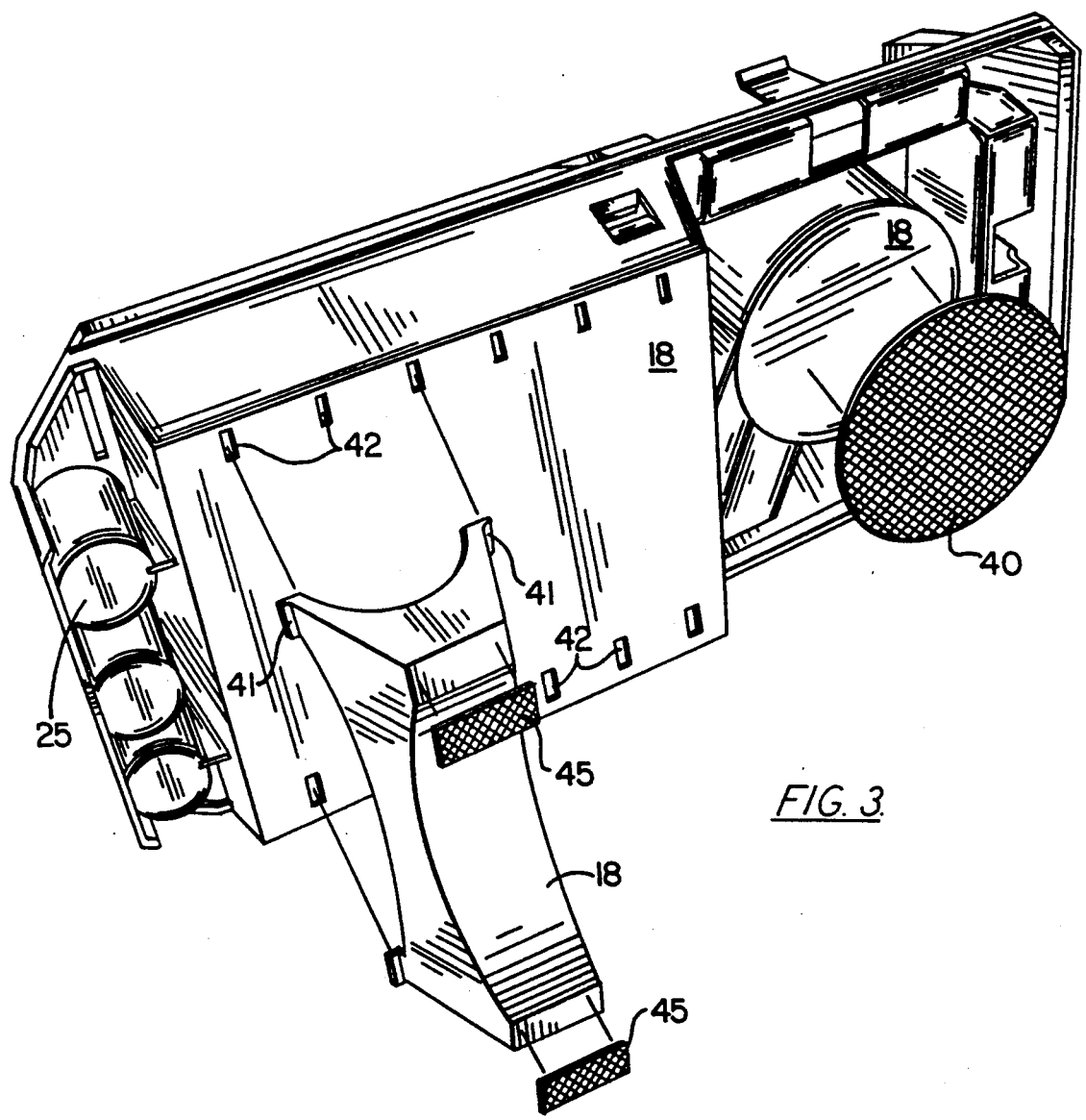
FIG. 3 is an exploded, perspective view of the car console as seen from below and to the side of the car console.

The rear end wall 16 includes molded slots 25 having different diameters to receive different denominations of change. The slots 25 allow a car passenger or driver to have change handy for tolls or other situations. The bottom of these slots are illustrated in FIG. 3. Referring now to FIG. 2, a compartment cover 30 is shown in its open position. The cover 30 is attached to the console by hinge means 31 that rotatably and detachably attach the cover to the console lo and form part of the rear wall 16 of the console. The top of the cover 30 defines the top of the rear portion 13 of the console. The cover also defines the top of a compartment inside the console. The compartment space 32 is useful for storing items such as cassette tapes that fit into the grooves 33 illustrated in FIG. 2. Certainly, other variations of the console could provide for the storage of other items inside the compartment 32. The cover 30 also includes tabs 34 that allow the cover to be releasably attached to and secured to the console. The latches 34 fit into notches 35 that are defined by the side walls 14 of the console. Other types of latching means would or could be used to secure the cover to the console.

Turning now to FIG. 3, there is a more detailed view of the bottom of the console. A rubberized pad 40 is adhesively attached to the front portion of the bottom of the console. This pad is designed to rest directly against the car seat and help prevent the console from sliding laterally on the car seat. In this preferred embodiment, the bottom of the front portion of the console is defined primarily by the circular base of the beverage holder 21.

FIG. 3 also illustrates a supporting member shown as the support leg 18 that is releasably attached to the bottom 18 of the rear portion 13 of the console. The purpose of the supporting member 18 is to elevate the rear of the console so that the top of the console is in a substantially horizontal orientation. In this way, beverages or other useful items may be properly held in a level position on the top of the console. The supporting member 18 includes tabs 41 that are inserted into notches 42 that are defined and situated in the bottom of the rear portion of the console. As illustrated in FIG. 3, there is a plurality of notches 42 into which the tabs 41 may be releasably attached. With these plurality of notches, a person may move the supporting member 18 towards the front end of the console or towards the rear of the console. In this way, the rear of the console may be elevated or lowered so that the angle between the front portion and the bottom of the supporting member will maintain the console in its level orientation. The raising or lowering of the rear of the console is accomplished in conjunction with the slope of the car seat. Since the car seat is generally higher towards the front of the seat, the moving of the supporting member towards the front of the console will raise the rear end of the console. If the car seat or other surface on which the console is placed is generally flat, the supporting member may be removed altogether so the console may rest in a level position on a level surface. The adjustable positioning of the supporting member allows the disclosed console to be used in connection with a number of different sloped surfaces.

The bottom of the supporting member 18 also includes pads 45 that are adhered to the portion of the supporting member that rests on a car seat. These pads, like the pad 40 on the front portion of the bottom of the console, help prevent the console from sliding laterally or forward and back on the car seat.

Although a particular embodiment of the invention has been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and the scope of the invention.

That which is claimed is:

1. A console adapted for use on a downwardly sloping car seat of the type that slopes generally downwardly from front to rear and which console is characterized by the ability to properly hold various articles such as beverage containers, notepads, pens and the like, and particularly in a substantial horizontal orientation despite the slope of the car seat, said console comprising a body comprising top, bottom, side and end walls defining a front portion and a rear portion, each of said front and rear portions comprising a substantial portion of said body, said top wall of said body further comprising means for receiving and supporting various articles, said bottom wall further comprising means for being rested on a sloping car seat with said front portion of said body toward the front of the car seat and said rear portion toward the rear of the car seat, and a supporting member carried by said rear portion of said body and extending downwardly from said bottom wall for supporting said rear portion on the car seat with said top wall of said body substantially horizontal despite the slope of the car seat, and adjusting means located on said bottom wall at said rear portion thereof for adjusting the longitudinal position of said supporting member with respect to the front portion of said body to thereby increase or decrease the angle between the front portion and the bottom of the supporting member to thereby level the top wall with respect to a sloping car seat regardless of the degree of slope of the seat, and wherein said adjusting means on said bottom wall of said rear portion comprises a plurality of receiving means longitudinally spaced along said bottom wall, and said supporting member comprises engaging means for detachable attachment to said receiving means for attaching said supporting member to any one of a plurality of locations along the length of said bottom wall of said rear portion.

2. A console according to claim 1 wherein said supporting member comprises a support leg.

3. A console according to claim 1 further comprising a nonskid material adhered to at least a portion of the surface of said bottom side of said console to prevent sliding of the console along the car seat.

4. A console according to claim 1 wherein said top side of said front portion defines a means for receiving and supporting a beverage container.

5. A console according to claim 1 wherein said rear portion comprises a compartment for storing various articles.

6. A console according to claim 5 wherein said compartment is further defined by a cover that is hingedly connected to one wall of the body of the console and that covers the compartment.

7. A console according to claim 1 wherein said console is further comprised of a plastic material.

8. A combination of a console with a downwardly sloping car seat of the type that slopes generally downwardly from front to rear, and which console is characterized by the ability to properly hold various articles such as beverage containers, notepads, pens and the like, despite the slope of the car seat, said combination comprising:

a sloping car seat, and a console, said console further comprising:

a body comprising top, bottom, side and end walls defining a front portion and a rear portion, each of said front and rear portions comprising a substantial portion of said body, and wherein a first portion of said bottom wall substantially corresponds to said front portion of said body and a second portion of said bottom wall substantially corresponds to said rear portion of said body;

said top wall of said body further comprising means for receiving and supporting various articles, said bottom wall further comprising means for being rested on a sloping car seat with said front portion of said body toward the front of the car seat and said rear portion toward the rear of the car seat, and a supporting member carried by said rear portion of said body and extending downwardly from said bottom wall for supporting said rear portion on the car seat with said top wall of said body substantially horizontal despite the slope of the car seat, and adjusting means located on said bottom wall at said rear portion thereof for adjusting the longitudinal position of said supporting member with respect to the front portion of said body to thereby increase or decrease the angle between the front portion and the bottom of the supporting member to thereby level the top wall with respect to a sloping car seat regardless of the degree of slope of the seat, and wherein said rear portion of said bottom wall comprises a plurality of receiving means longitudinally spaced along said bottom wall and said supporting member comprises engaging means for detachable attachment to said receiving means so that the supporting member can be attached to any one of a plurality of locations along the length of the bottom wall of said rear portion.

9. A combination according to claim 8 further comprising a nonskid material adhered to at least a portion of the surface of said bottom side of said console to prevent sliding of the console along the car seat.

10. A combination according to claim 8 wherein said top side of said front portion defines a means for receiving and supporting a beverage container.

11. A combination according to claim 8 wherein said rear portion comprises a compartment for storing various articles.

12. A combination according to claim 11 wherein said compartment is further defined by a cover that is hingedly connected to the end wall of the body of the console and that covers the compartment.

* * * * *

UNITED STATES PATENT AND TRADEMARK OFFICE
CERTIFICATE OF CORRECTION

PATENT NO. : 5,205,452
DATED : April 27, 1993
INVENTOR(S) : Mankey

It is certified that error appears in the above-identified patent and that said Letters Patent is hereby corrected as shown below:

Column 3, line 9, "lo" should be --10--.

Column 5, line 28, "body" should be --bottom wall--.

Signed and Sealed this

Eighteenth Day of January, 1994

Attest:

BRUCE LEHMAN

Attesting Officer     Commissioner of Patents and Trademarks